United States Patent
Yang et al.

(10) Patent No.: US 10,075,869 B2
(45) Date of Patent: Sep. 11, 2018

(54) DATA TRANSMISSION METHOD AND APPARATUS

(71) Applicant: Huawei Technologies Co., LTD., Shenzhen (CN)

(72) Inventors: Liang Yang, Kowloon (HK); Ning Fei, Kowloon (HK); Jiannong Cao, Kowloon (HK); Huimin Zhang, Shenzhen (CN); Yonggang Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 431 days.

(21) Appl. No.: 14/317,671

(22) Filed: Jun. 27, 2014

(65) Prior Publication Data

US 2014/0334306 A1 Nov. 13, 2014

Related U.S. Application Data

(63) Continuation of application No. PCT/CN2012/087790, filed on Dec. 28, 2012.

(30) Foreign Application Priority Data

Dec. 28, 2011 (CN) .......................... 2011 1 0448555

(51) Int. Cl.
*G01R 31/08* (2006.01)
*G06F 11/00* (2006.01)
(Continued)

(52) U.S. Cl.
CPC ......... *H04W 28/0231* (2013.01); *H04L 45/22* (2013.01); *H04L 47/12* (2013.01);
(Continued)

(58) Field of Classification Search
CPC .......................... H04W 28/0231; H04L 47/12
See application file for complete search history.

(56) References Cited

U.S. PATENT DOCUMENTS 7,697,496 B2    4/2010   Jung
7,720,021 B1 *  5/2010   Zhou ..................... H04W 88/04
                                                            370/315
(Continued)

FOREIGN PATENT DOCUMENTS

CN    101115248 A    1/2008
CN    101360339 A    2/2009
(Continued)

OTHER PUBLICATIONS

IEEE Computer Society, "IEEE Standard for Information technology—Telecommunications and information exchange between systems—Local and metropolitan area networks—Specific requirements: Part 11: Wireless LAN Medium Access Control (MAC) and Physical Layer (PHY) Specifications" 802.11™ IEEE Std 802.11™—2007, 1232 pages.
(Continued)

*Primary Examiner* — Derrick Ferris
*Assistant Examiner* — Farhad Ali
(74) *Attorney, Agent, or Firm* — Brinks Gilson & Lione

(57) ABSTRACT

A data transmission method and apparatus are provided. The method comprises: receiving service data sent by a first terminal, the first terminal being a single-mode terminal or a multi-mode terminal; monitoring forwarding load traffic of a back-end egress of a first network device in a first network; when the load traffic reaches present load traffic, switching a current forwarding mode to a routing mode, and selecting a second terminal as a forwarding node of the first terminal, the second terminal being a multi-mode terminal; forwarding the service data to the second terminal, so that the second terminal coverts the service data and sends the converted service data to a second network device in a second network. According the embodiments of the present invention, the technical problem of a low utilization rate of the total bandwidth of a network egress in the prior art is solved.

22 Claims, 7 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 28/02* (2009.01)
*H04L 12/801* (2013.01)
*H04L 12/707* (2013.01)
*H04L 29/06* (2006.01)
*H04L 29/08* (2006.01)
*H04W 88/04* (2009.01)
*H04W 88/06* (2009.01)

(52) U.S. Cl.
CPC ........ *H04L 67/2823* (2013.01); *H04L 67/327* (2013.01); *H04L 69/08* (2013.01); *H04L 69/14* (2013.01); *H04W 28/0247* (2013.01); *H04W 88/04* (2013.01); *H04W 88/06* (2013.01)

(56) References Cited

U.S. PATENT DOCUMENTS

| | | | | |
|---|---|---|---|---|
| 8,614,964 | B1 * | 12/2013 | Vargantwar | H04L 1/0002 370/252 |
| 2001/0055954 | A1 | 12/2001 | Cheng | |
| 2005/0143130 | A1 | 6/2005 | Horneman | |
| 2006/0239271 | A1 * | 10/2006 | Khasnabish | H04L 45/00 370/395.21 |
| 2008/0247346 | A1 | 10/2008 | Gulbani et al. | |
| 2009/0221265 | A1 | 9/2009 | Liu et al. | |
| 2010/0172249 | A1 * | 7/2010 | Liu | H04L 45/124 370/252 |
| 2010/0273475 | A1 | 10/2010 | Lee et al. | |
| 2013/0012251 | A1 * | 1/2013 | Roddy | H04W 28/08 455/509 |

FOREIGN PATENT DOCUMENTS

| | | | |
|---|---|---|---|
| CN | 101427599 A | 5/2009 | |
| CN | 101483888 A | 7/2009 | |
| CN | 101652968 A | 2/2010 | |
| CN | 101778114 A | 7/2010 | |
| CN | 101897158 A | 11/2010 | |
| EP | 2115978 | 11/2009 | |
| WO | WO 2005119977 A1 * | 12/2005 | ............ H04W 88/00 |
| WO | WO 2008/095127 A2 | 8/2008 | |

OTHER PUBLICATIONS

Meyer, Jr., "Logger Protocol Error" Network Working Group, Nov. 16, 1970, 1 pages.

\* cited by examiner

DATA TRANSMISSION METHOD AND APPARATUS

CROSS-REFERENCE TO RELATED APPLICATIONS

This application is a continuation of International Application No. PCT/CN2012/087790, filed on Dec. 28, 2012, which claims priority to Chinese Patent Application No. 201110448555.9, filed on Dec. 28, 2011, both of which are hereby incorporated by reference in their entireties.

FIELD OF THE TECHNOLOGY

The present disclosure relates to the technical field of communication, and in particular to a method for data transmission and an apparatus thereof.

BACKGROUND OF THE INVENTION

With the popularity of smart terminals, a smart terminal (e.g., mobile phone) may either access the Internet via WiFi (Wireless Fidelity) AP (access point) or cellular network (GPRS (General Packet Radio Service), 3G or LTE (Long Term Evolution)) at home or in a same company or office, or at the same time access the WiFi AP or cellular network for the smart terminal.

It is known that, a WiFi AP may access the Internet via wired network (2M, 10M, 100M or 1000M), cellular network (GPRS, 3G or LTE) or other WiFi AP (corresponding to Mesh network). Theses networks are not absolutely advantageous over the 3G/LTE back-end egress of the smart terminal. Therefore, even if the smart terminal selects WiFi to access the Internet, a maximum egress bandwidth of the smart terminal may not be guaranteed, especially when multiple smart terminals access a same AP simultaneously.

At present, a parallel access is often adopted to improve the egress bandwidth of smart terminal. That is to say, a smart terminal (for example, a multi-mode terminal) may enable both the WiFi interface and the cellular interface, and select flexibly access network according to scheduling strategy to transmit user data, thereby making full use of the whole back-end egress bandwidth of the smart terminal.

However, in research and practice of the conventional technology, it is found that only how the smart terminal utilizes multiple access networks to maximize the throughput or how to achieve a seamless switching is taken into consideration in the existing implementation of the parallel access, but not to consider the cooperation of the multiple smart terminals utilizing the parallel access. That is to say, even though a certain terminal adopts parallel access, it is only guaranteed that the smart terminal itself can use the both interfaces (i.e., the WiFi interface and the cellular interface), but may not bring benefit to the other smart terminals in the same network. Therefore, the question of how to make full use of the back-end egress bandwidth of WiFi AP and cellular network is still to be solved.

SUMMARY OF THE INVENTION

It is to provide a method and apparatus for data transmission to solve the problem of low utilization ratio of total egress bandwidth existed in the conventional technology.

In view of this, a method for data transmission is provided according to an embodiment of the disclosure. The method includes:

receiving service data sent by a first terminal, where the first terminal is a single-mode terminal or a multi-mode terminal;

monitoring a load flow rate forwarded via a back-end egress of a first network device in a first network;

switching from a forwarding mode to a routing mode in a case that the load flow rate reaches a preset load flow rate and then selecting a second terminal as a forwarding node for the first terminal, where the second terminal is a multi-mode terminal; and forwarding the service data to the second terminal such that the second terminal converts the service data and sends the converted service data to a second network device in a second network.

Another method for data transmission is provided according to an embodiment of the disclosure, including:

receiving service data to be forwarded to a second network, where the service data is sent by a first network device in a first network;

converting an address and a frame format of the service data; and sending the converted service data to a second network device in the second network;

where the first and the second networks are of different types.

Accordingly, an apparatus for data transmission is provided according to an embodiment of the disclosure, including:

a first receiving unit, configured to receive service data sent by a first terminal, wherein the first terminal is a single-mode terminal or a multi-mode terminal;

a monitoring unit, configured to monitor a load flow rate forwarded via a back-end egress of a first network device in a first network;

a first switching unit, configured to switch from a forwarding mode to a routing mode in a case that the load flow rate reaches a preset load flow rate;

a selecting unit, configured to select a second terminal as a forwarding node for the first terminal in a case that the switching unit switches from the forwarding mode to the routing mode, where the second terminal is a multi-mode terminal; and a forwarding unit, configured to forward the service data to the second terminal such that the second terminal converts the service data and sends the converted service data to a second network device in a second network, where the first and the second networks are of different types.

Another apparatus for data transmission is provided according to an embodiment of the disclosure, including:

a first receiving unit, configured to receive service data to be forwarded to a second network, where the service data is sent by a first network device in a first network;

a converting unit, configured to convert an address and a frame format of the service data; and a forwarding unit, configured to send the converted service data to a second network device in the second network;

where the first and the second networks are of different types.

It can be known from the foregoing technical solutions that, in a case that the service data sent by the first terminal is received, it is switched from the forwarding mode to the routing mode if it is monitored that the load flow rate forwarded via back-end egress reaches the preset load flow rate, and the second terminal is selected as a forwarding node to forward the service data. The service data is sent to the second terminal, and the second terminal converts the address and the frame format after receiving the service data and sends the converted service data to the second network device in the second network. That is to say, in an embodiment, after the service data sent by the terminal is received, another terminal may be requested to forward the service data if the load flow rate of the back-end egress reaches the preset load flow rate, hence the egress bandwidth of the network may be utilized sufficiently; in addition a terminal may not only transmit its own data but also assist other terminals in transmitting data, on the premise of meeting its own bandwidth requirement, therefore the total throughput of multiple terminals may be increased, and the multiple interfaces of the multiple terminals may work cooperatively.

DETAILED DESCRIPTION OF THE EMBODIMENTS

For better understanding of the solutions provided by the disclosure, detailed description is set forth in the following in conjunction with drawings and embodiments.

Figure 1:
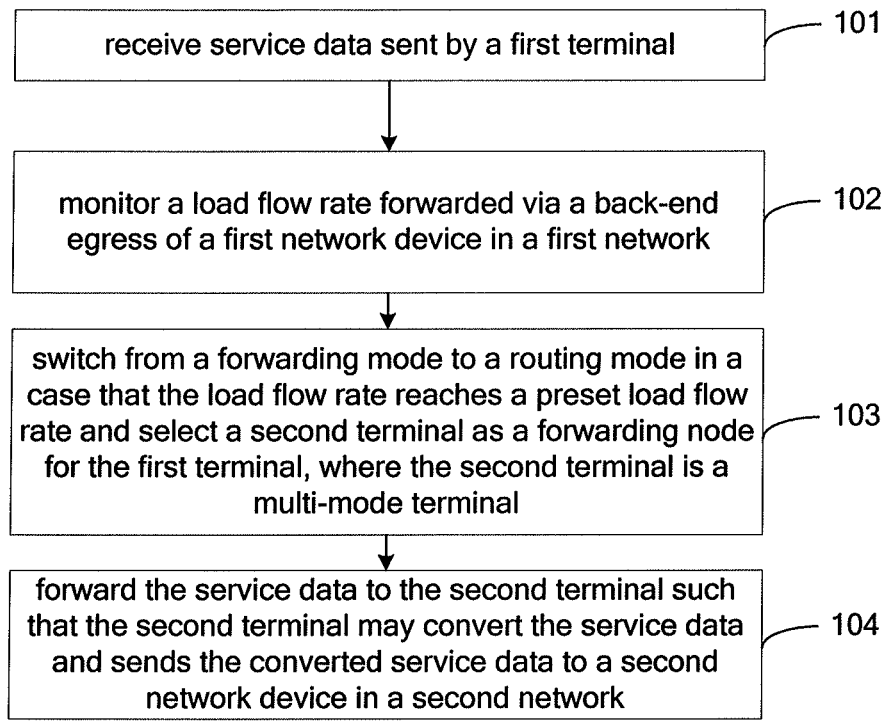
FIG. 1 is a flow chart of a method for data transmission according to an embodiment of the disclosure.

FIG. 1 is a flow chart of a method for data transmission according to an embodiment of the disclosure. In an embodiment, in a case that a first terminal is a single-mode terminal, the terminal may access either a first network or a second network; in a case that the terminal is a multi-mode terminal, the terminal may access both the first network and the second network, where the first network and the second network are in different types. The method includes Step 101 to Step 104 as follows.

Step 101 is to receive service data sent by a first terminal, where the first terminal may be a single-mode terminal or a multi-mode terminal; or the first terminal may include multiple single-mode terminals or multiple multi-mode terminals; or the first terminal may include at least one single-mode terminal and one multi-mode terminal, and this embodiment is not limited in this aspect.

Step 102 is to monitor a load flow rate forwarded via a back-end egress of a first network device in a first network.

In a case that service data is received, the service data is to be forwarded via the back-end egress of the first network device.

Step 103 is to switch from a forwarding mode to a routing mode in a case that the load flow rate reaches a preset load flow rate and select a second terminal as a forwarding node for the first terminal, where the second terminal is a multi-mode terminal.

Step 104 is to forward the service data to the second terminal such that the second terminal may convert the service data and sends the converted service data to a second network device in a second network.

Preferably, in a case that the load flow rate of the back-end egress of the first network does not reach the preset load flow rate, the service data may be sent directly.

In an embodiment, in a case that the first network device (e.g., WiFi AP) in the first network (e.g., WiFi network) receives the service data sent by the first terminal (the terminal may be one multi-mode terminal or multiple multi-mode terminals, and this embodiment is not limited in this aspect), the first network device in the first network may select an appropriate second terminal (i.e., other terminal, except the first terminal, connected to the first and the second networks) according to the status of the load flow rate forwarded via the back-end egress of the first network device, such as the status that the forwarded load flow rate reaches or approaches to an egress bandwidth, and forward the received service data of the first terminal to the second terminal; the second terminal may forward the service data via the second network (e.g., a cellular network) connected with the second terminal. In this case, the data traffic of the second terminal and the second network device in the second network (e.g., a cellular access point) may include both the service data of the second terminal and the service data forwarded by the first network device (e.g., the WiFi AP).

That is to say, at the WiFi AP side, the operation mode of the WiFi AP includes an ordinary forwarding mode and a routing mode. In the ordinary forwarding mode, the WiFi AP tries to send all the received service data to the next hop; in the routing mode, a WiFi AP takes all the connected multi-mode terminals as potential network egresses. The WiFi AP selects an appropriate multi-mode terminal as a forwarding node according to the load of the WiFi AP and the loads of all the multi-mode terminals and forwards the received service data via the forwarding node such that the service data to be transmitted may be scheduled flexibly.

In the same way, in a case that the first network is a cellular network, the first network device may be a cellular access point, then the second network may be a WiFi network, and the second network device may be a WiFi AP. In this case, after the cellular access point receives the service data sent by the first terminal, if the data flow rate of the back-end egress of the cellular access point reaches or approaches to the egress bandwidth, the cellular access point may request the second terminal connected to the cellular access point to assist in forwarding the service data of the first terminal via the WiFi network connected with the second terminal. The implementation is similar to the above procedure, and detailed description is omitted herein.

In other words, at the cellular access point side, the operation mode of the cellular access point also includes an ordinary forwarding mode and a routing mode. In the ordinary forwarding mode, the cellular access point sends all the received data to the next hop; in the routing mode, the cellular access point takes all the multi-mode terminals as potential network egresses. The cellular access point selects an appropriate multi-mode terminal as a forwarding node according to the load of the cellular access point and the loads of all the multi-mode terminals such that the data traffics to be transmitted may be scheduled flexibly.

In addition, the first network device in the first network may further be other cellular access point, such as Femtocell or dual-mode (pico) base station. The second network device in the second network is WiFi AP. That is to say, in a case that the load undertaken on the egress bandwidth of a cellular access point increases or the cellular access point fails, a WiFi interface of the multi-mode terminal connected to the cellular access point may assist the cellular access point in forwarding part of the service data, thereby improving the performance of the entire network.

Preferably, in the routing mode, before the service data is forwarded to the second terminal, the method may further include: sending a mode switching instruction to the second terminal; receiving a message for acknowledging the mode switching sent by the second terminal.

Preferably, in the process of forwarding service data, the method may further include: switching from the routing mode to the forwarding mode for the first network device if it is monitored that the load flow rate of the first network device does not reach the preset load flow rate; sending to the second terminal an instruction for switching off the forwarding mode; receiving a message for acknowledging to switch off the forwarding mode switching; directly sending the service data to a next hop by the first network device.

Preferably, the process of selecting the second terminal as the forwarding node for the first terminal are implemented in two cases:

The first case: in the routing mode, querying the load flow rates of all the multi-mode terminals, except the first terminal, that are connected to the first network device, where the load flow rate includes: the load flow rate received and sent via the first network, the load flow rate received and sent via the second network and an access type in accessing the second network and the current rate; selecting an appropriate multi-mode terminal as a forwarding node for the first terminal according to the load flow rate, where the selected terminal is the second terminal.

The second case: querying all the multi-mode terminals, except the first terminal, that are connected to the first network device and the load flow rates fed back during the connection, where the load flow rate fed back during the connection includes: the accessing type in accessing by carrying the second network, the supported rate, the information about whether or not being the forwarding node and the forwarding flow rate.

An appropriate multi-mode terminal is selected as a forwarding node for the first terminal according to the load flow rate, and a forwarding delay of the second terminal is increased, where the selected terminal is the second terminal.

Preferably, in order to control the flow rate for forwarding the service data by the multi-mode terminal, the method may further include: in the process of forwarding the service data, receiving a request sent by the second terminal for decreasing or increasing the flow rate for forwarding the service data; sending to the second terminal a response for acknowledging to decrease or increase the flow rate for forwarding the service data; decreasing or increasing, in accordance with a strategy for scheduling traffic to be forwarded, the flow rate for forwarding the service data to the second terminal.

Figure 2:
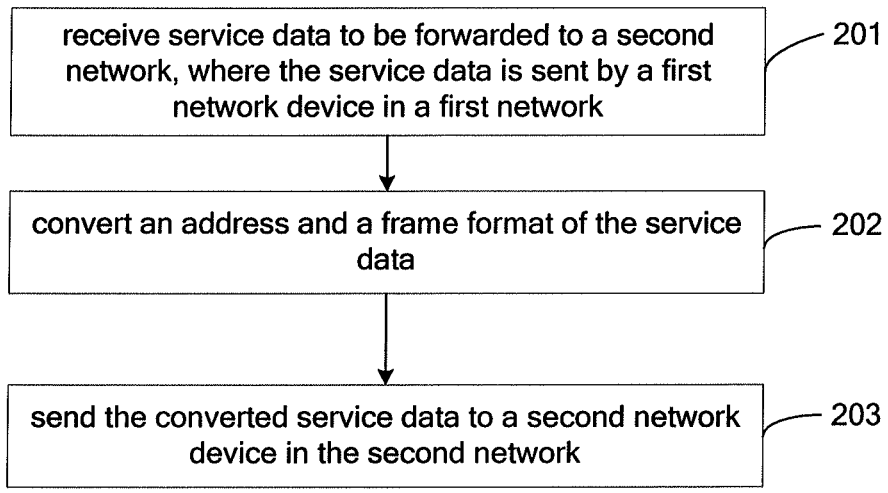
FIG. 2 is a flow chart of a method for transmitting data according to another embodiment of the disclosure.

FIG. 2 is a flow chart of a method for data transmission according to another embodiment of the disclosure. In an embodiment, a first terminal is connected to a first network, and a second terminal is connected to a second network, where the first and the second networks are in different types. The method includes Step 201 to Step 203 as follows.

Step 201 is to receive service data to be forwarded to a second network, where the service data is sent by a first network device in a first network;

Step 202 is to convert an address and a frame format of the service data;

Step 203 is to send the converted service data to a second network device in the second network.

Preferably, in a routing mode, before the process of receiving service data to be forwarded to the second network, the method may further include the following steps: receiving a switching instruction sent by the first network device; switching from a terminal mode to a forwarding mode according to the load flow rate and a configuration strategy; sending to the first network device a message for acknowledging to switch.

Preferably, in the routing mode, the method may further include: in the process of forwarding service data, feeding back a request to the first network device for decreasing a flow rate for forwarding the service data in a case that the flow rate for forwarding the service data exceeds a first preset threshold; receiving a response indicating that the first network device decreases the flow rate for forwarding the service data sent by the first network device; or feeding back a request to the first network device for increasing a flow rate for forwarding the service data in a case that the flow rate for forwarding the service data is smaller than a second preset threshold; receiving a response indicating that the first network device increases the flow rate for forwarding the service data.

Preferably, in the routing mode, the method may further include the following steps: receiving an instruction for switching off a forwarding mode switching sent by the first network device; switching from the forwarding mode to the terminal mode according to the instruction for switching off the forwarding mode switching; sending to the first network device a message for acknowledging to switch off the forwarding mode switching.

Preferably, in a non-routing mode, before the process of receiving service data to be forwarded to the second network, the method may further include the following steps: detecting and predicting a data packet of the service data sent and received in the second network; and switching from the terminal mode to the forwarding mode in a case that a difference between the data packet and a preset data packet is greater than a preset threshold.

Preferably, in a non-routing mode, the method may further include the following steps: monitoring a flow rate for transceiving the service data in the second network in the process of forwarding service data; switching from the forwarding mode to the terminal mode in a case that the flow rate is smaller than a third threshold.

In an embodiment, the second terminal, i.e., a multi-mode terminal (e.g., cellphone, laptop) supports the terminal mode and the forwarding mode. The first network is a WiFi, and the second network is a cellular network. In the terminal mode, the multi-mode terminal may access the Internet to access data service via a WiFi interface or a cellular interface, and in this case the multi-mode terminal plays the same role as an ordinary terminal. In the forwarding mode for forwarding the service data of other multi-mode terminals, the multi-mode terminal may assist in forwarding the service data received from a third party (i.e., other multi-mode terminals) via the WiFi network or the cellular network. In addition, the multi-mode terminal may activate a Network Address Translation (NAT) function as needed. For example, in a case that a WiFi AP requests a multi-mode terminal to assist in forwarding data, the multi-mode terminal may receive from the WiFi AP via a WiFi interface the service data to be forwarded, and convert the address of the service data and convert the frame format thereof, and sends the converted service data via a cellular interface for the cellular network. In the same way, in a case that a cellular access point requests a multi-mode terminal to assist in forwarding data, the multi-mode terminal may receive from the cellular access point via a cellular interface the service data to be forwarded, and convert the address of the service data and convert the frame format thereof, and sends the converted service data via a WiFi interface for the WiFi network. In addition, the multi-mode terminal may switch between the terminal mode and the forwarding mode based on its own situation.

In an embodiment, the data traffic transmission between a multi-mode terminal and a network device (e.g., WiFi AP or cellular access point) may include the transmission of the data sent from the multi-mode terminal to a peer terminal and the transmission of the data returned from the peer terminal. In the technical solution of the disclosure, a WiFi AP may forward the data received from other terminals to a multi-mode terminal and request the multi-mode terminal to assist in forwarding the data via a connected cellular network. In this case, the data traffic of the multi-mode terminal and the cellular access point may include both the data of the multi-mode terminal and the data of other terminals forwarded from the WiFi AP. In the same way, the cellular access point may request the multi-mode terminal to assist in forwarding the received data of other terminals via a connected WiFi network, hence the egress bandwidth of the network may be utilized adequately, and a terminal may not only transmit its own data but also assist other terminals in transmitting data while meeting its own bandwidth requirement, therefore the total throughput of multiple terminals may be increased, and the multiple interfaces of the multiple terminals may work cooperatively.

Figure 3:
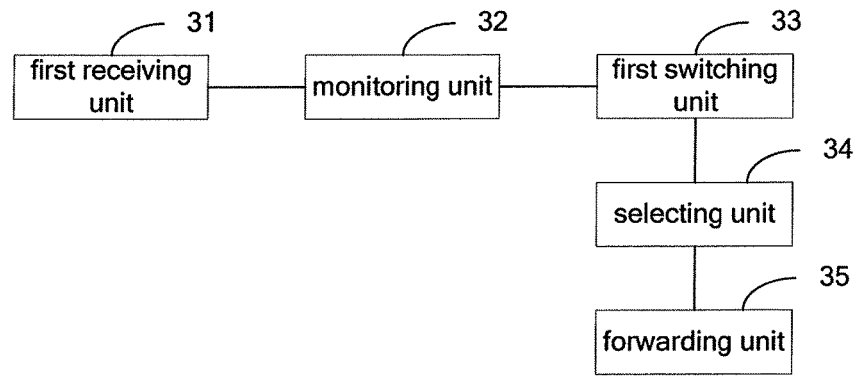
FIG. 3 is a schematic structure diagram of an apparatus for data transmission according to an embodiment of the disclosure.

Correspondingly, an apparatus for data transmission is provided in an embodiment of the disclosure, the structure of which is shown in FIG. 3. The device includes a first receiving unit 31, a monitoring unit 32, a first switching unit 33, a selecting unit 34 and a forwarding unit 35.

The first receiving unit 31 is configured to receive service data sent by a first terminal; the monitoring unit 32 is configured to monitor a load flow rate forwarded via a back-end egress of a first network device in a first network; the first switching unit 33 is configured to switch from a forwarding mode to a routing mode in a case that the load flow rate reaches a preset load flow rate; the selecting unit 34 is configured to select a second terminal as a forwarding node for the first terminal in a case that the switching unit switches from the forwarding mode to the routing mode, where the second terminal is a multi-mode terminal; the forwarding unit 35 is configured to forward the service data to the second terminal such that the second terminal may convert the service data and sends the converted service data to a second network device in a second network, where the first and the second networks are of different types.

Preferably, in the routing mode, the apparatus may further include a first sending unit and a second receiving unit, where the first sending unit is configured to send a mode switching instruction to the second terminal before the service data is forwarded to the second terminal by the forwarding unit, and the second receiving unit is configured to receive a message for acknowledging the mode switching sent by the second terminal.

Preferably, in the routing mode, the selecting unit includes a first querying unit and a first forwarding node selecting unit, where the first querying unit is configured to query load flow rates of all the multi-mode terminals, except the first terminal, that are connected to the first network device in the routing mode, and the first forwarding node selecting unit is configured to select an appropriate multi-mode terminal as a forwarding node for the first terminal according to the load flow rate, where the selected terminal is the second terminal.

Preferably, the apparatus may further include an acquisition unit and an adjusting unit, where the acquisition unit is configured to acquire network load information of the second terminal in the process of forwarding service data, and the adjusting unit is configured to adjust dynamically, according to the network load information, the service data volume to be forwarded to the second terminal.

The acquisition unit includes a request sending unit and a request receiving unit; or a third receiving unit, a second sending unit and a flow rate control unit.

The request sending unit is configured to send a request to the second terminal for querying network load information actively.

The request receiving unit is configured to receive from the second terminal a response comprising the network load information.

The third receiving unit is configured to receive, in the process of forwarding the service data, a request of decreasing or increasing the flow rate for forwarding the service data, wherein the request is sent from the second terminal; the second sending unit is configured to send to the second terminal a response for acknowledging to decrease or increase the flow rate for forwarding the service data; the flow rate control unit is configured to decrease or increase, in accordance with a strategy for scheduling traffic to be forwarded, the flow rate for forwarding the service data to the second terminal.

Preferably, the apparatus may further include a second switching unit, a third sending unit, a fourth receiving unit and a fourth sending unit, where the second switching unit is configured to switch from the routing mode to the forwarding mode in a case that the load flow rate does not reach the preset load flow rate; the third sending unit is configured to send to the second terminal an instruction for switching off the forwarding mode switching; the fourth receiving unit is configured to receive a message for acknowledging to switch off the forwarding mode switching sent by the second terminal; the fourth sending unit is configured to send directly the service data.

Preferably, in the routing mode, the selecting unit includes a second querying unit and a second forwarding node selecting unit, where the second querying unit is configured to query all the multi-mode terminals, except the first terminal, that are connected to the first network device and the load flow rate fed back during the connection; the second forwarding node selecting unit is configured to select an appropriate multi-mode terminal as a forwarding node for the first terminal according to the load flow rates and increase a forwarding delay of the second terminal, where the selected multi-mode terminal is the second terminal.

Preferably, the apparatus for data transmission may further include a fifth sending unit configured to send the service data directly in a case that the load flow rate does not reach the preset load flow rate.

Preferably, the apparatus for data transmission may be integrated in a WiFi AP in a virtual local area network, a cellular access point, a Femtocell or a pico base station, or the apparatus for data transmission may be deployed independently, and the embodiment is not limited in this aspect.

The implementation of the function and effect of each unit of the apparatus may refer to the corresponding implementation described in the foregoing method, and detailed description is omitted herein.

Figure 4:
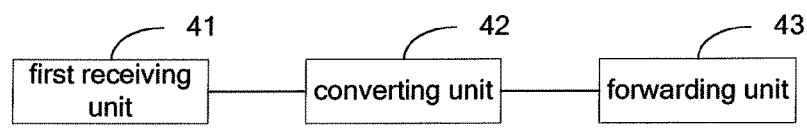
FIG. 4 is a schematic structure diagram of an apparatus for data transmission according to another embodiment of the disclosure.

Another apparatus for data transmission is provided in an embodiment of the disclosure, the structure of which is schematically shown in FIG. 4. The apparatus includes a first receiving unit 41, a converting unit 42 and a forwarding unit 43. The first receiving unit 41 is configured to receive service data to be forwarded to a second network, where the service data is sent by a first network device in a first network; the converting unit 42 is configured to convert an address and a frame format of the service data; the forwarding unit 43 is configured to send the converted service data to a second network device in the second network, where the first and the second networks are of different types.

Preferably, in a routing mode, the apparatus further includes a second receiving unit, a first switching unit and a first sending unit. The second receiving unit is configured to receive a mode switching instruction sent by the first network device before receiving the service data to be forwarded to the second network; the first switching unit is configured to switch from a terminal mode to a forwarding mode according to a load flow rate of the apparatus and a configuration strategy; the first sending unit is configured to send to the first network device a message for acknowledging to switch.

Preferably, in the routing mode, the apparatus may further include a first determining unit, a second sending unit and a third receiving unit; and/or include a second determining unit, a third sending unit and a fourth receiving unit. The first determining unit is configured to determine whether a flow rate for forwarding the service data exceeds a first preset threshold in the process of forwarding service data; the second sending unit is configured to feed back to the first network device a request of decreasing the flow rate for forwarding the service data in a case that the first determining unit determines that the flow rate for forwarding the service data exceeds the first preset threshold; the third receiving unit is configured to receive a response indicating that the first network device decreases the flow rate for forwarding the service data; the second determining unit is configured to determine whether the flow rate for forwarding the service data is smaller than a second preset threshold in the process of forwarding service data; the third sending unit is configured to feed back to the first network device a request of increasing the flow rate for forwarding the service data in a case that the second determining unit determines that the flow rate for forwarding the service data is smaller than the second preset threshold; the fourth receiving unit is configured to receive a response indicating that the first network device increases the flow rate for forwarding the service data.

Preferably, the apparatus may further include a fifth receiving unit, a second switching unit and a fourth sending unit. The fifth receiving unit is configured to receive an instruction for switching off a forwarding mode switching sent by the first network device; the second switching unit is configured to switch from the forwarding mode to the terminal mode according to the instruction for switching off the forwarding mode switching; the fourth sending unit is configured to send to the first network device a message for acknowledging to switch off the forwarding mode switching.

Preferably, the apparatus may further include a predicting unit, a third determining unit and a third switching unit. The predicting unit is configured to detect and predict a data packet of the service data sent and received in the second network before the service data to be forwarded to the second network sent by the first network device is received; the third determining unit is configured to determine whether a difference between the data packet and a preset data packet is greater than a preset threshold; the third switching unit is configured to switch from the terminal mode to the forwarding mode in a case that the third determining unit determines that the difference between the data packet and the preset data packet is greater than the preset threshold.

Preferably, the apparatus may further include a monitoring unit, a fourth determining unit and a fourth switching unit. The monitoring unit is configured to monitoring the flow rate for transceiving the service data in the second network; the fourth determining unit is configured to determine whether the flow rate is smaller than a third threshold; the fourth switching unit is configured to switch from the forwarding mode to the terminal mode in a case that the fourth determining unit determines that the flow rate is smaller than the third threshold.

For the implementation of the function and effect of each unit of the apparatus, reference may be made to the corresponding implementation described in the foregoing method, and detailed description is omitted herein.

In order to make those skilled in the art understand the disclosure better, the disclosure may be specified in conjunction with application examples.

Figure 5:
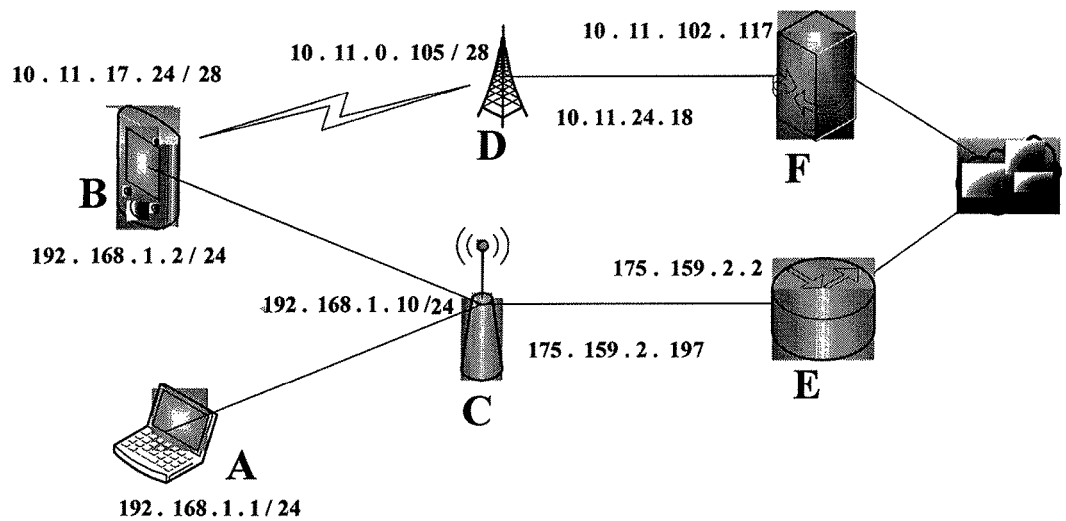
FIG. 5 is a topological structure diagram illustrating that a multi-mode terminal assists in forwarding WiFi AP traffic via a cellular access point connected to the multi-mode terminal according to an embodiment of the disclosure.

FIG. 5 is a topological structure diagram illustrating that a multi-mode terminal assists in forwarding its WiFi AP traffic via a cellular access point connected to the multi-mode terminal according to an embodiment of the disclosure. In an embodiment, terminal A (which may be a single-mode terminal or a multi-mode terminal) and terminal B (which is a multi-mode terminal) each includes a WiFi interface and each is connected to a first network device C (a WiFi AP), and terminal B is further connected to a second network device D (a cellular access point) via a cellular interface. 3G egress address for terminal B is 10.11.17.24, an Ethernet egress address of first network device C is 175.159.2.197. Terminal A and terminal B communicate with first network device C in 802.11 data frame format, terminal B communicates with second network device D in a cellular network frame format, first network device C communicates with router E in 802.3 frame format, and cellular access point D communicates with gateway F in 802.3 frame format.

As shown in FIG. 5, first network device C monitors the forwarded load (i.e., data traffic between C and E) at the back-end egress in real time. In a case that it is determined that the load is not full, i.e., there is still unoccupied egress bandwidth, terminal A and terminal B may send the data to first network device C in 802.11 frame data format, and first network device C may convert the data from 802.11 frame format to 802.3 frame format and sends the converted service data to the router.

In a case that the load of first network device C (WiFi AP) is full, i.e., there is no unoccupied bandwidth, the first network device C may switch from the current ordinary forwarding mode to the routing mode. In addition, the second terminal (i.e., the multi-mode terminal B) is selected as a forwarding node for terminal A with strategy and negotiation, and then the data in 802.11 frame format sent by terminal A may be forwarded to multi-mode terminal B.

The multi-mode terminal B may switch from the terminal mode (i.e., an operating mode) to the forwarding mode after receiving the data in 802.11 frame format and convert a source address of the data packet from IP address 192.168.1.1 to IP address 10.11.17.24 of the multi-mode terminal B, and a TCP or UDP data packet included in the data of 802.11 frame format may be directed to a certain port, hence the data packet sent by terminal A via terminal B is equivalent to the data packet sent form the certain port of terminal B from the perspective of external network. That is to say, the received data packet, as long as being received from the corresponding TCP or UDP port, may be taken as the one to be sent to terminal A, and terminal B needs to convert a destination address of the data packet into 192.168.1.1 and convert the frame format of the data packet into 802.11 frame format, i.e., the frame format which can be identified by second network device B.

In an embodiment of the disclosure, the WiFi AP forwards data via the cellular interface of the multi-mode terminal in an interactive mode and a non-interactive mode.

Embodiment 1

Figure 6:
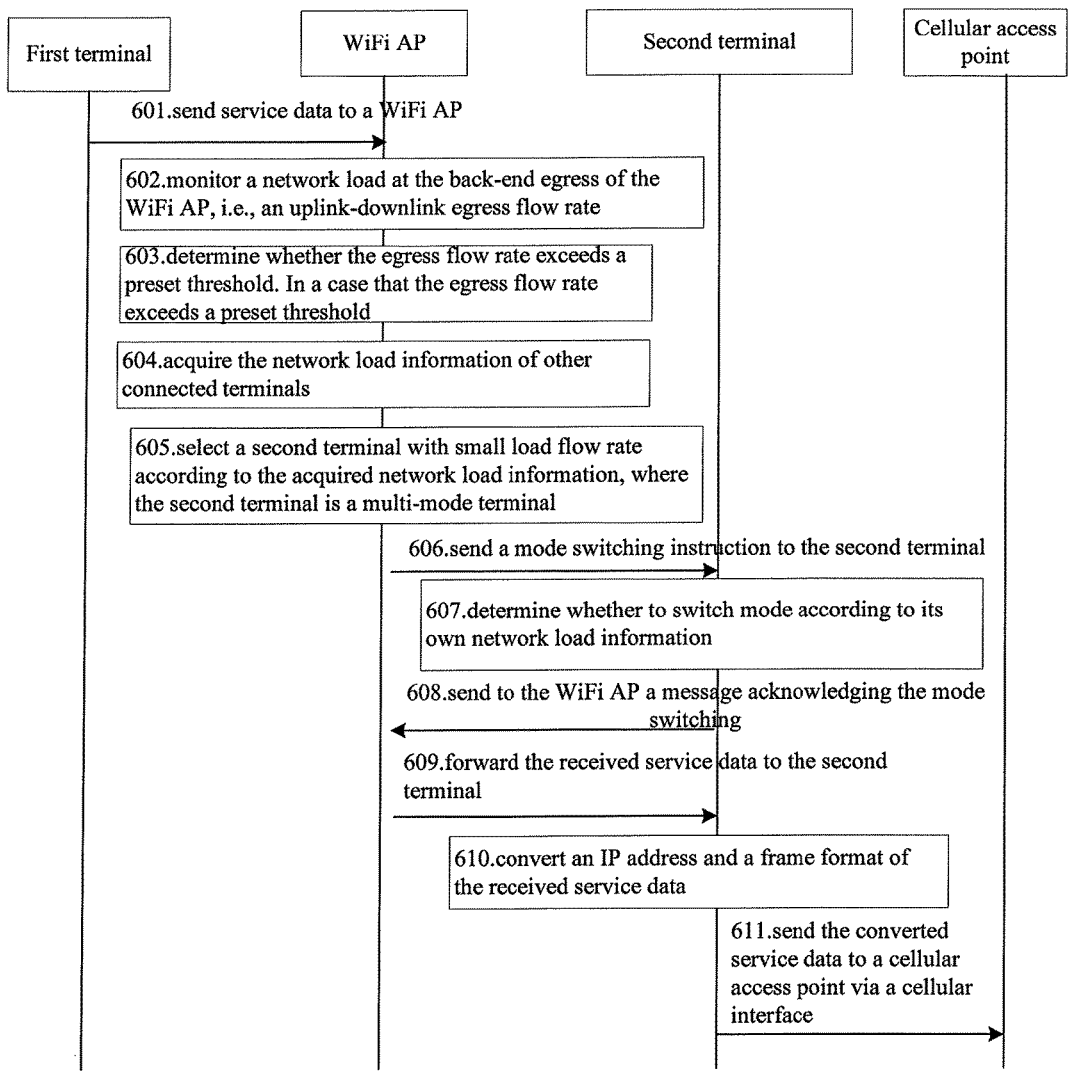
FIG. 6 is a flow chart illustrating that a WiFi AP forwards data via a cellular interface of a multi-mode terminal in an interactive mode according to an embodiment of the disclosure.

FIG. 6 is a flow chart illustrating that a WiFi AP forwards data via a cellular interface of a multi-mode terminal in an interactive mode provided according to an embodiment of the disclosure. In this embodiment, a WiFi AP initially works in an ordinary forwarding mode and sends all the data received from a WiFi interface out via a back-end egress. Meanwhile, the WiFi AP monitors in real time a forwarded load status at the back-end egress of the WiFi AP. In a case that the load is full, such as that an uplink-downlink flow rate exceeds a threshold (80% of the egress bandwidth), the WiFi AP may switch from the current ordinary forwarding mode to a routing mode.

In the routing mode, the WiFi needs to select an appropriate multi-mode terminal as a forwarding node to assist in forwarding the traffic of other terminals, so as to relieve the forwarding stress of the WiFi AP egress. In this case, the WiFi AP queries from the connected multi-mode terminal the data load flow rate of the multi-mode terminal, where the data load flow rate may include the load flow rate received and sent via a cellular network, the load flow rate received and sent via a WiFi network, the type of the accessed cellular network and a current rate, etc., and the WiFi AP may select an appropriate multi-mode terminal as the forwarding node strategically and then send a mode switching instruction to the selected forwarding node. The forwarding node may determine whether to switch to the forwarding mode according to its own status such as load flow rate, local configuration strategy. The forwarding node may send an acknowledge message to the WiFi AP in a case that the forwarding node determines to switch to the forwarding mode. The WiFi AP may forward the data flow of other terminals to the selected terminal (i.e., the forwarding node) after receiving the message for acknowledging to switch sent by the forwarding node. The interactive process shown in FIG. 6 includes Step 601 to 611 as follows.

In Step 601, a first terminal sends service data to a WiFi AP, where the first terminal may be a single-mode terminal or a multi-mode terminal, and the service data is to be forwarded via the WiFi AP.

In Step 602, the WiFi AP monitors a network load at the back-end egress of the WiFi AP, i.e., an uplink-downlink egress flow rate.

Step 603 is to determine whether the egress flow rate exceeds a preset threshold. In a case that the egress flow rate exceeds a preset threshold, Step 604 may be performed; otherwise, the received service data may be forwarded directly to a next hop, and the process is ended (not shown in FIG. 6).

In Step 604, the WiFi AP acquires the network load information (including interface capacity and load flow rate) of other connected terminals (not shown in FIG. 6).

The WiFi AP sends instruction for querying network load to other terminals connected with the WiFi AP (not shown in FIG. 6), where the other terminals connected with the WiFi AP do not include the first terminal connected to the WiFi AP; other terminals send their network load information (including interface capacity and load flow rate) to the WiFi AP.

In Step 605, the WiFi AP selects a second terminal with small load flow rate according to the acquired network load information, where the second terminal is a multi-mode terminal. The second terminal is taken as an example in this embodiment.

In Step 606, the WiFi AP sends a mode switching instruction to the second terminal.

In Step 607, the second terminal determines whether to switch mode after receiving the mode switching instruction according to its own network load information, i.e., whether to switch from the terminal mode to the forwarding mode. Step 608 may be performed in a case that the mode switching is agreed.

In Step 608, the second terminal sends to the WiFi AP a message acknowledging the mode switching.

In this step, the second terminal may first switch from the terminal mode to the forwarding mode and then send to the WiFi AP the message acknowledging the mode switching, or the second terminal may send to the WiFi AP the message acknowledging the mode switching first and then switch from the terminal mode to the forwarding mode.

In Step 609, the WiFi AP forwards the received service data to the second terminal after receiving the acknowledge message.

In Step 610, the second terminal converts an IP address and a frame format of the received service data.

In Step 611, the second terminal sends the converted service data to a cellular access point via a cellular interface.

Preferably, in the foregoing forwarding process, the second terminal may forward the received service data while sending its own service data via the cellular interface.

Figure 7:
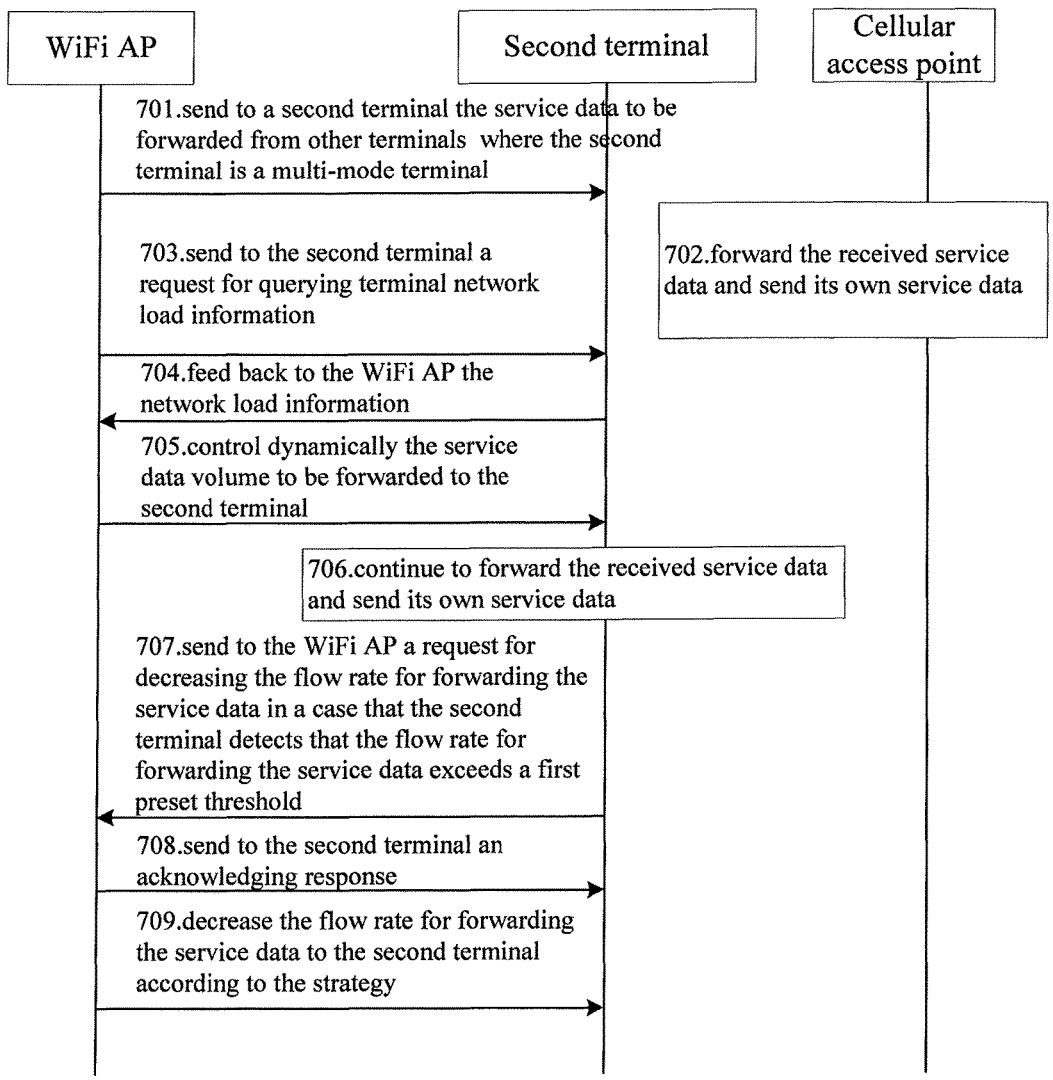
FIG. 7 is a flow chart illustrating that a WiFi AP schedules flexibly the data traffic to be forwarded according to the forwarding terminal information according to an embodiment of the disclosure.

Preferably, in the foregoing forwarding process, the WiFi AP may request, periodically or at any time, a forwarding terminal (i.e., the second terminal) to report the network traffic information to schedule the data flow flexibly, such as to increase or decrease the forwarding flow rate of the second terminal. In addition, the forwarding terminal (i.e., the second terminal) may feed back to the WiFi AP a request for decreasing the forwarding flow rate in a case that the forwarding terminal detects that the forwarding flow rate exceeds the preset threshold. The WiFi AP may schedule the data flow flexibly according to strategy when receiving the request, i.e., decrease the flow rate to be forwarded to the second terminal. The WiFi AP may also increase the flow rate to be forwarded to the second terminal according to strategy in a case that the second terminal sends a request for increasing the forwarding flow rate. FIG. 7 is a flow chart illustrating that a WiFi AP schedules flexibly the data traffic to be forwarded according to the forwarding terminal information in an embodiment of the disclosure. The method includes Step 701 to 709 as follows.

In Step 701, a WiFi AP sends to a second terminal the service data to be forwarded for other terminals (e.g., a first terminal), where the second terminal is a multi-mode terminal.

In Step 702, the second terminal forwards the received service data and sends its own service data.

In Step 703, the WiFi AP sends a request to the second terminal for querying terminal network load information.

In Step 704, the second terminal feeds back to the WiFi AP the network load information, where the network load information may include an interface capacity and the existing load.

In Step 705, the WiFi AP controls dynamically the service data volume to be forwarded to the second terminal according to the network load information.

That is to say, the service data volume to be forwarded to the second terminal may be increased or decreased according to the network load information, or the WiFi AP may stop forwarding the service data to the second terminal.

In Step 706, the second terminal continues to forward the received service data and send its own service data.

In Step 707, the second terminal sends to the WiFi AP a request for decreasing the flow rate for forwarding the service data in a case that the second terminal detects that the flow rate for forwarding the service data exceeds a first preset threshold.

In Step 708, the WiFi AP sends to the second terminal an acknowledging response.

In Step 709, the WiFi AP decreases the flow rate for forwarding the service data to the second terminal according to the strategy.

In Step 707 to Step 709, the second terminal may send to the WiFi AP a request for increasing the flow rate for forwarding the service data in a case that the second terminal detects that the flow rate for forwarding the service data is smaller than a second preset threshold. The WiFi AP may increase the flow rate for forwarding the service data to the second terminal according to the strategy after sending to the second terminal an acknowledging response. The first and the second thresholds may be different or the same, and this embodiment is not limited in this aspect.

Figure 8:
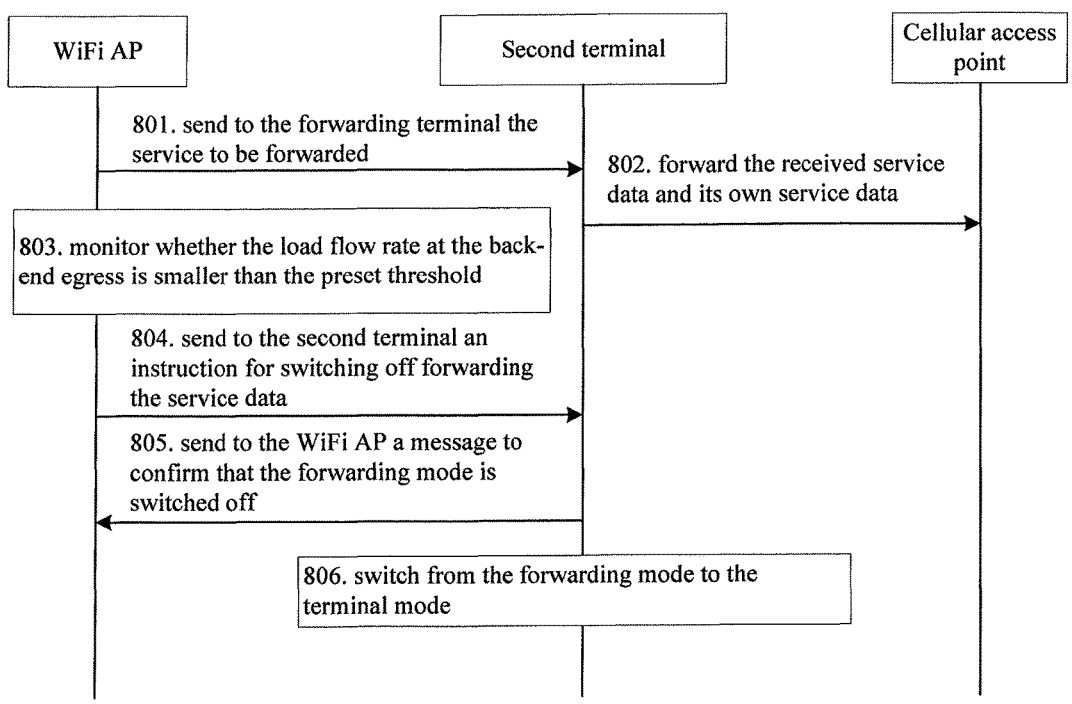
FIG. 8 is a flow chart illustrating that a WiFi AP instructs a multi-mode terminal to switch to a terminal mode according to an embodiment of the disclosure.

Preferably, in the foregoing embodiment, the WiFi AP may switch from a routing mode to an ordinary forwarding mode in a case that the WiFi AP finds that the load flow rate at the back-end egress is smaller than the preset threshold, then the WiFi AP stops requesting the forwarding terminal (e.g., the second terminal) to forward service data for the WiFi AP; the WiFi AP sends an instruction for switching off the forwarding mode to the forwarding terminal which is forwarding data and instructs the forwarding terminal to switch from the current mode to the terminal mode. The forwarding terminal may acknowledge when receiving the instruction for switching off the forwarding mode and may switch to the terminal mode, i.e., switch to operate in the ordinary terminal mode and only forward its own data traffic. FIG. 8 is a flow chart illustrating that a WiFi AP instructs a multi-mode terminal to switch to a terminal mode provided according to an embodiment of the disclosure. The method includes the steps from Step 801 to Step 806 as follows.

In Step 801, the WiFi AP sends to the forwarding terminal (e.g., the second terminal in the foregoing embodiment, and the second terminal is taken as an example in this embodiment) the service to be forwarded, where the second terminal is a multi-mode terminal.

In Step 802, the second terminal forwards to the cellular access point the received service data and its own service data.

In Step 803, the WiFi AP monitors whether the load flow rate at the back-end egress is smaller than the preset threshold, where if the load flow rate is smaller than the preset threshold, Step 804 may be performed.

In Step 804, the WiFi AP sends to the second terminal an instruction for switching off forwarding the service data, i.e., requests the second terminal to stop forwarding the service data.

In Step 805, the second terminal sends to the WiFi AP a message to confirm that the forwarding mode is switched off.

In Step 806, the second terminal switches from the forwarding mode to the terminal mode.

In all the foregoing embodiments, in the interactive mode, the scheduling strategy for the WiFi AP to select the forwarding terminal to forward service data flow includes:

The WiFi AP may query the dynamic information of the multi-mode terminal at any time, such as the network egress bandwidth of the cellular and WLAN sides of the multi-mode terminal, the real-time network load flow rate, the type of service flow, Round-Trip Time (RTT) and the current signal quality and transmission rate, hence the WiFi AP may select the appropriate forwarding node for the data flow to be forwarded according to the information.

The WiFi AP may select a forwarding node with small load, or may select a terminal with high rate, or may select a terminal with low utilization rate based on comprehensive consideration of the rate and the load. For example, the WiFi AP finds that a certain multi-mode terminal 1 adopts HSPA+ (2×2 MIMO), the rate is 11.5 Mbit/s, and the current flow rate is 0.4 Mbit/s; terminal 2 adopts 1×EV-DO Rev A, the rate is 1.8 Mbit/s, and the current flow rate is 0.4 Mbit/s, then the utilization rates of the two devices are respectively 26% and 22%, and the flow to be forwarded may be distributed to terminal 2.

In the same way, when scheduling the traffic to be forwarded, the WiFi AP may determine for the multi-mode terminal the flow rate for forwarding the data flow after determining the forwarding capacity of the multi-mode terminal according to the queried information and schedule the data flow to be forwarded. For example, the WiFi AP may schedule the service data flow with high priority to the terminal with high forwarding capacity such that the forwarding of the service data with high priority may be ensured.

In addition, in the non-interactive mode, the multi-mode terminal may send to the WiFi AP the forwarding capacity information such as the accessed cellular network type only when the multi-mode terminal is connected to the WiFi AP; at other times, the multi-mode terminal may not conduct exchange regarding the forwarding capacity with the WiFi AP.

The multi-mode terminal may report to the WiFi AP the basic information of the cellular network interface such as the cellular network type and the supported rate when the multi-mode terminal is connected to the WiFi AP. In non-interactive mode, the overhead of the message exchange between the WiFi AP and the multi-mode terminal may be reduced. The terminal and the WiFi AP may not exchange information dynamically in the process of communication, therefore the WiFi AP in the non-interactive mode may not schedule each data flow and select the forwarding node as accurately as in the interactive mode.

Figure 9:
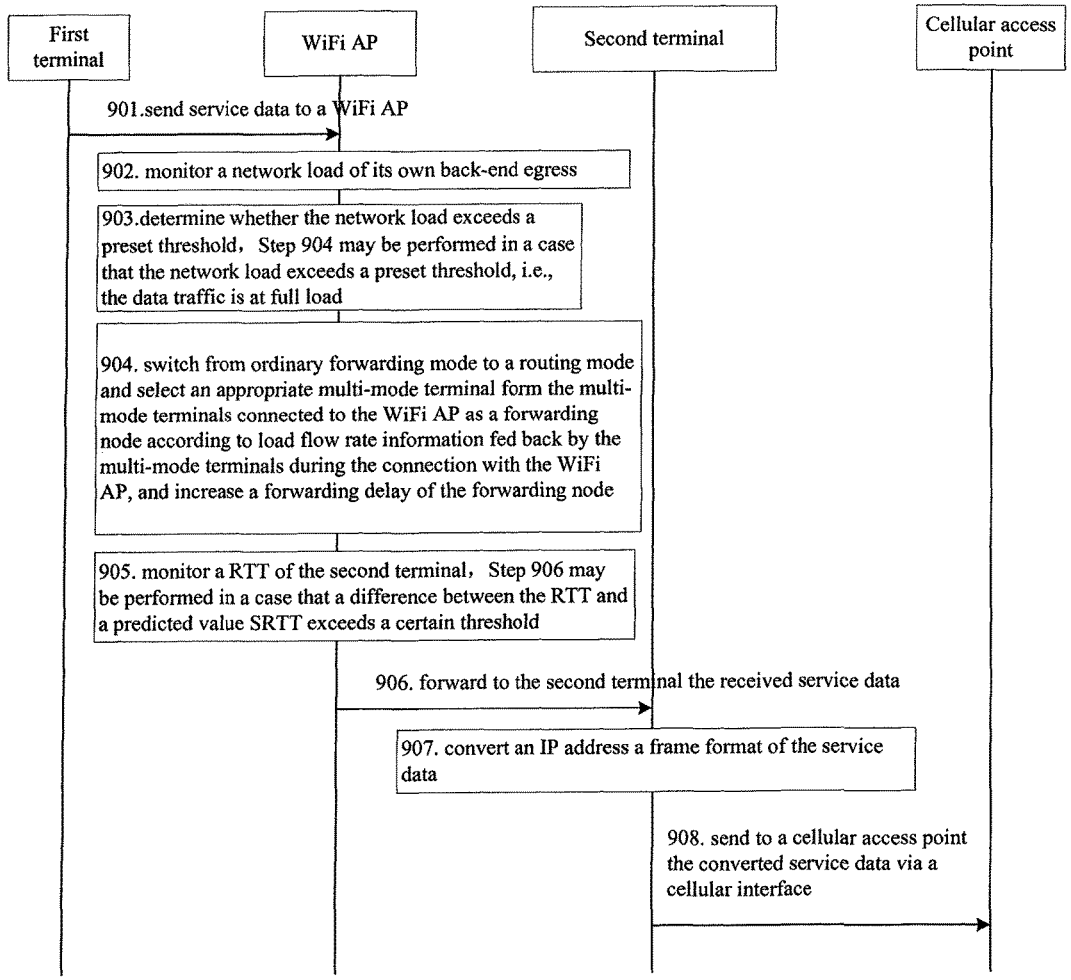
FIG. 9 is a flow chart illustrating that a WiFi AP forwards data via a cellular interface of a multi-mode terminal in a non-interactive mode according to an embodiment of the disclosure.

That is to say, the WiFi AP may monitor the flow rate at back-end egress in real time in the non-interactive mode. The WiFi AP may switch from the current ordinary forwarding mode to the routing mode in a case that the egress flow rate is at full capacity, and then the WiFi AP may select the appropriate multi-mode terminal as the forwarding node according to the flow rate information fed back by the multi-mode terminals during the connection with the WiFi AP and the WiFi data flow rate information, and increase the forwarding delay of these multi-mode terminals. The multi-mode terminal operates initially in the ordinary terminal mode and access data via WiFi network and cellular network, and meanwhile the multi-mode terminal monitors and predicts the data packet RTT at WiFi side. The terminal may switch from the current ordinary operating mode to the forwarding mode in a case that the difference between the RTT and the predicted value SRTT exceeds a certain threshold such as 50%. For the algorithm of SRTT prediction, one may refer to the definition of RFC 79: SRTT[i]=(1−a)*SRTT[i−1]+a*RTT 0<a<1, where a is ⅛ normally. The flow of the process is shown in FIG. 9. FIG. 9 is a flow chart illustrating that a WiFi AP forwards data via a cellular interface of a multi-mode terminal in a non-interactive mode according to an embodiment of the disclosure. The process includes steps from Step 901 to Step 908 as follows.

In Step 901, a first terminal sends service data to a WiFi AP, where the service data is to be forwarded via the WiFi AP.

In Step 902, the WiFi AP monitors a network load at the back-end egress of the WiFi AP (i.e., data flow rate).

Step 903 is to determine whether the network load exceeds a preset threshold. Step 904 may be performed in a case that the network load exceeds a preset threshold, i.e., the data traffic is at full load; or the received service data may be forwarded directly to a next hop in a case that the network load does not exceed the preset threshold, and then the flow may be ended (not shown in FIG. 9).

In Step 904, the WiFi AP switches from a ordinary forwarding mode to a routing mode, selects an appropriate multi-mode terminal (second terminal, i.e., multi-mode terminal) as a forwarding node according to load flow rate information fed back by the multi-mode terminals during the connection with the WiFi AP, and the WiFi AP may increase a forwarding delay of the forwarding node.

In Step 905, the WiFi AP monitors a RTT of the second terminal. Step 906 may be performed in a case that a difference between the RTT and a predicted value SRTT exceeds a certain threshold; or the monitoring may be maintained in a case that that the difference between the RTT and the predicted value SRTT does not exceed the threshold (not shown in FIG. 9).

In Step 906, the WiFi AP forwards to the second terminal the received service data.

In Step 907, the WiFi AP converts an IP address a frame format of the service data.

In Step 908, the second terminal sends to a cellular access point the converted service data via a cellular interface.

Figure 10:
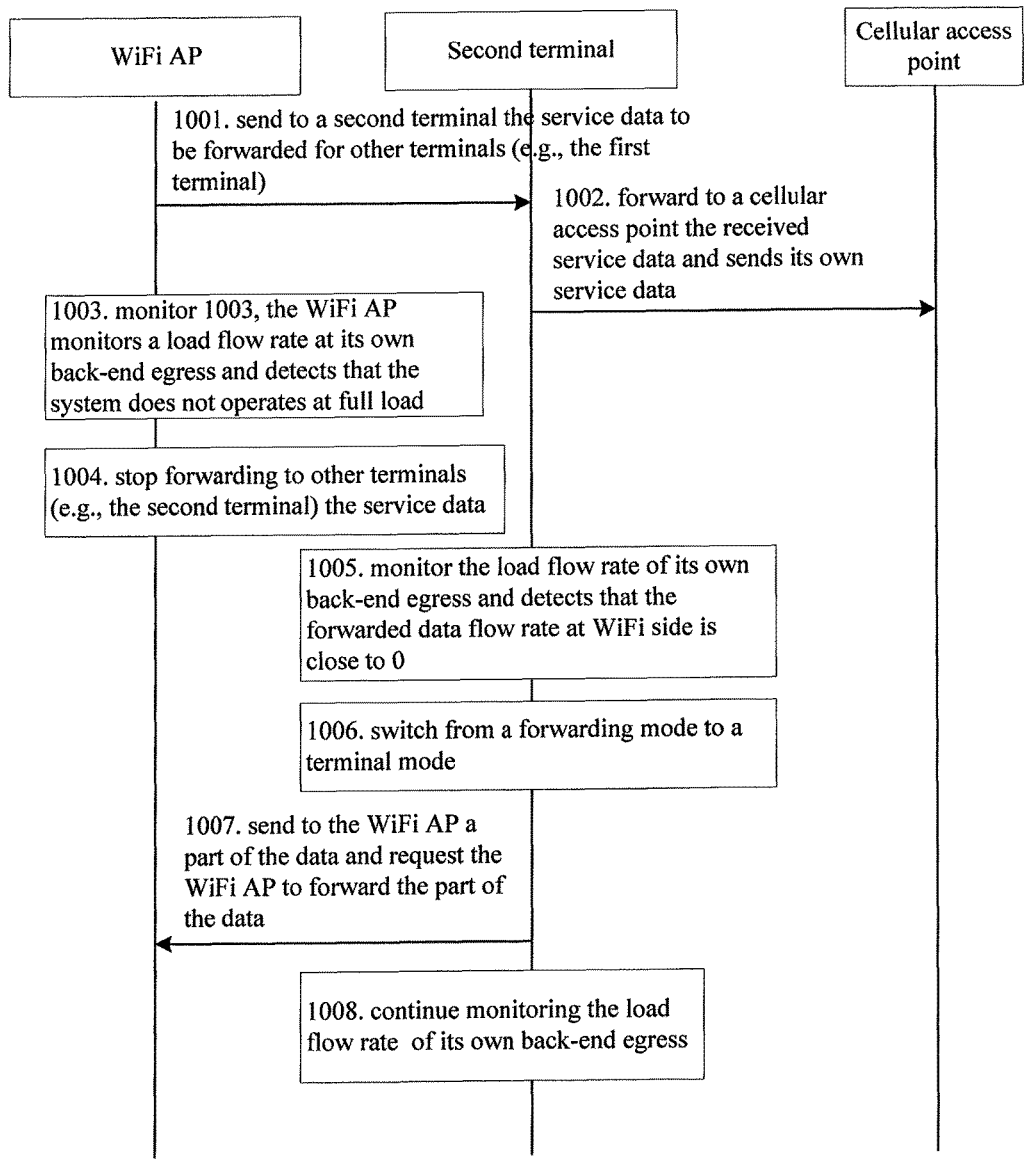
FIG. 10 is a flow chart illustrating that a multi-mode terminal switches to a terminal mode in a non-interactive mode according to an embodiment of the disclosure.

Preferably, the second terminal in the forwarding mode monitors a flow rate received and sent via a WiFi interface. The second terminal may switch from the forwarding mode to a terminal mode in a case that the flow rate is smaller than a preset threshold (e.g., the flow rate is 0) within a certain period of time, and in this case the second terminal may forwards its own traffic via the WiFi AP according to a scheduling strategy and continues monitoring the RTT of the data packet at the WiFi interface. The process in shown in FIG. 10. FIG. 10 is a flow chart illustrating that a multi-mode terminal switches to a terminal mode in a non-interactive mode according to an embodiment of the disclosure, including the following steps.

In Step 1001, a WiFi AP sends to a second terminal the service data to be forwarded for other terminals (e.g., the first terminal), where the second terminal is a multi-mode terminal.

In Step 1002, the second terminal forwards to a cellular access point the received service data and sends its own service data;

In Step 1003, the WiFi AP monitors a load flow rate at its own back-end egress and detects that the system does not operates at full load;

In Step 1004, the WiFi AP stops forwarding to other terminals (e.g., the second terminal) the service data;

In Step 1005, the second terminal monitors the load flow rate of its own back-end egress (i.e., the forwarded data traffic at WiFi side, RTT packet) and detects that the forwarded data flow rate at WiFi side is close to 0;

In Step 1006, the second terminal switches from a forwarding mode to a terminal mode;

In Step 1007, the second terminal sends to the WiFi AP a part of the data and request the WiFi AP to forward the part of the data;

In Step 1008, the second terminal continues monitoring the load flow rate of its own back-end egress.

Preferably, in the embodiments for the non-interactive mode, the WiFi AP may select candidate forwarding node (i.e., the second terminal in the embodiment) according to information carried by the terminals when accessing, including the type of the accessed cellular network, the supported rate, the information about whether or not being a forwarding node and forwarding flow rate. After the candidate forwarding node is determined, the WiFi AP may prolong gradually the time delay of data forwarding for the terminal(s) which does not operate in the forwarding mode, and the WiFi AP may stop forwarding data for the forwarding node(s) at last, such that the candidate forwarding node(s) may switch to the forwarding mode.

At the same time, the WiFi AP may monitor a RSSI % and the flow rate of these access terminals, in a case that the RSSI % is greater than 60 (configuration value) and the flow rate remains 0 for a period of time (according to IEEE 802.11 standard, the RSSI value is between 1 to 255, but the maximum values set by different manufacturers are different; for example, the maximum value set by CISCO company is 100, so a relative value is often adopted, i.e., RSSI %=(RSSI×100)/RSSI_Max). Once the WiFi AP determine that the forwarding node switches to the forwarding mode because the multi-mode terminal finds that RTT increases, the node may be selected as the forwarding mode.

The WiFi AP may select the preferential forwarding node and schedule flexibly the data flow to be forwarded according to the performance of the cellular interfaces (refer to LTE, HSPA, UMTS, EDGE, GPRS) in a case that the WiFi AP detects that there are multiple multi-mode terminals which are switched to the forwarding mode.

The WiFi AP may schedule the data flow to be forwarded according to the service type of the data flow, QoS requirements, flow rate and the forwarding capacity of the multi-mode terminal, and each data flow is identified by a source and a destination IP address and a source and a destination port.

In the non-interactive mode, the WiFi AP may only know the flow rate of the multi-mode terminal at the WiFi side, including the forwarding flow rate and the transmitting flow rate of the terminal, rather than an actual total flow rate of each multi-mode terminal since the multi-mode terminal may further transmit its own data via cellular interface. Accordingly, the total flow rate in forwarding data by the multi-mode terminal may be defined as twice of the measured flow rate at the WiFi AP side (configuration value). The WiFi AP determines the forwarding capacity of the terminal according to the rate and the predicted flow rate at the cellular interface of the multi-mode terminal and then determines for the terminal the flow rate for forwarding the data flow. The WiFi AP may schedule the service data flow of high priority to the terminal with high forwarding capacity to ensure the forwarding of the service data of high priority.

Embodiment 2

The major concern in this disclosure is to forward the data traffic of one network via another network in the case of multiple connection networks. The technical solution in embodiment 1 is to forward data of WiFi network via cellular network. In practice, the traffic of cellular network may also be forwarded via WiFi network.

If the load undertaken by an egress bandwidth of a cellular access point (e.g., Femtocell or pico base station) increases or the cellular access point fails, a WiFi interface of a multi-mode terminal connected to the cellular access point may assist in forwarding part of data for the cellular access point so as to improve the performance of the entire network.

The multi-mode terminal may assist the cellular access point to which the multi-mode terminal connects in forwarding the data flow of the other terminal which is connected the cellular access point. For example, multi-mode terminal B in forwarding mode may operate as a forwarding node which multi-mode terminal in forwarding the data flow of the terminal C.

After receiving the traffic of the forwarded terminal C via a cellular link, the cellular access point may send the traffic of the forwarded terminal C to the forwarding terminal B via the cellular link in a case that the cellular access point determines to forward the traffic via the forwarding terminal B in routing mode, and then the forwarding terminal B may forward the traffic via a WiFi link. Following the same path, the forwarding terminal B may receive the data aimed to the forwarded terminal C from a data network and then forward the data to the forwarded terminal C.

Similar to the case of forwarding via the cellular interface of multi-mode terminal B the data of other terminals of the WiFi AP to which terminal B is connected, the process of forwarding the cellular side data via the WiFi interface of multi-mode terminal B may be implemented in the interactive mode and the non-interactive mode.

In interactive mode, the cellular access point may query to the multi-mode terminal(s) in a case that the cellular access point requires to select a forwarding node to assist in forwarding data, and then the multi-mode terminal(s) may feed back the network conditions of an accessed WiFi AP interface, including the current rate, the load flow rate at WiFi side, the security algorithm adopted in accessing the WiFi AP, etc. After receiving the information, the cellular access point may determine an appropriate terminal as the forwarding node and send to the forwarding node a request of switching to forwarding mode. After receiving a acknowledging response from the forwarding node, the cellular access point may select an appropriate data flow for the forwarding node to forward according to strategy. In the forwarding process, the forwarding node and the cellular access point may interact with each other in real time or periodically to assist the cellular access in flexibly selecting forwarding node and scheduling the traffic to be forwarded.

In non-interactive mode, the forwarding capacity of the multi-mode terminal may be learned only when the multi-mode terminal accesses the cellular access point, and forwarding capacity is mainly static information. For example, when accessing to the cellular access point, multi-mode capacity B may inform the cellular point of the WiFi capacity of the multi-mode capacity B, such as the supported rate of air interface, the security information of accessing to WiFi AP, SSID and BSSID to show its forwarding capacity. Then the cellular access point may select forwarding node according to the information. Like the WiFi AP, the cellular access point delays or even stops forwarding the traffic to the forwarding node, so as to inform the forwarding node to switch to the forwarding mode. When the cellular access finds that the flow rate of a certain multi-mode terminal remains zero for a period of time, the terminal may be taken as the forwarding node.

According to the definition and implementation of the existing 3GPP protocol, a cellular access point may know information about air interface and user information better than a WiFi AP, hence the cellular access point may use more information in selecting forwarding node and schedule the traffic to be forwarded more flexibly, and the cellular access point may schedule the traffic according to the strategy in embodiment as well as certain new strategies. For example, when selecting and scheduling cellular traffic, the cellular access point may select and schedule the traffic to be forwarded according to user attribute and priority. For example, according to the user attribute such as gold, silver and copper, the traffic of the gold user may be scheduled preferentially as the traffic to be forwarded, to guarantee that the user of high priority accesses service data normally.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

By the foregoing description of the embodiments, those skilled in the art may understand clearly that the present disclosure may be implemented via software and necessary hardware platform, or via the hardware only; in most cases, the former is preferable. In view of this, all or part of the embodiments of the disclosure may be implemented by software product, where the software product may be stored in readable storage medium, such as ROM/RAM, disk or optical disk, and multiple instructions are included in the software product to enable a computer device (personal computer, server or network device) to implement the method provided according to each embodiment or certain part of the embodiment of the disclosure.

Several preferable ways for implementing the disclosure are provided according to the above embodiments. It is noted that some changes and modifications made by those skilled in the art with the principle of the invention may fall into the protection scope of the disclosure.

The invention claimed is:

1. A method for data transmission, comprising:
   receiving, by a first network device, service data sent by a first terminal, wherein the first terminal is a single-mode terminal or a multi-mode terminal;
   monitoring a load flow rate forwarded via a back-end egress of the first network device in a first network;
   when the load flow rate reaches a preset load flow rate, switching the first network device from a forwarding mode to a routing mode; and selecting a second terminal connected with the first network device, as a forwarding node for the first terminal, wherein the second terminal is a multi-mode terminal; and
   forwarding, by the first network device, the service data sent by the first terminal to the second terminal such that the second terminal converts the service data and sends the converted service data to a second network device in a second network,
   wherein the selecting the second terminal as the forwarding node for the first terminal comprises:
   except to the first terminal that is connected to the first network device, the first network device sending an instruction to multi-mode terminals to query from only the multi-mode terminals, load flow rates of the multi-mode terminals, wherein the load flow rates of the multi-mode terminals comprises: at least one of the load flow rate received and sent via the first network, the load flow rate received and sent via the second network, an access type in accessing the second network and a current rate; and
   selecting, according to the load flow rates, the forwarding node for the first terminal from one of the multi-mode terminals with a small load flow rate, wherein the selected multi-mode terminal with the small load flow rate is the second terminal.

2. The method according to claim 1, wherein in the routing mode, before forwarding the service data to the second terminal, the method further comprises:
   sending a mode switching instruction to the second terminal; and
   receiving a message for acknowledging the mode switching sent from the second terminal.

3. The method according to claim 2, wherein in the routing mode, the method further comprises:
   switching from the routing mode to the forwarding mode in a case that it is monitored that the load flow rate of the first network device does not reach the preset load flow rate;
   sending to the second terminal an instruction for switching off the forwarding mode;
   receiving a message for acknowledging to switch off the forwarding mode sent from the second terminal; and
   sending the service data.

4. The method according to claim 1, further comprising:
   acquiring network load information of the second terminal in a process of forwarding the service data; and
   adjusting dynamically, according to the network load information, a volume of the service data to be forwarded to the second terminal.

5. The method according to claim 4, wherein the acquiring the network load information of the second terminal comprises:
   sending to the second terminal a request for actively querying the network load information; receiving from the second terminal a response comprising the network load information; or
   receiving a request of decreasing or increasing a flow rate for forwarding the service data, wherein the request is sent directly from the second terminal; sending to the second terminal a response for acknowledging to decrease or increase the flow rate of the service data to be forwarded; decreasing or increasing, in accordance with a strategy for scheduling traffic to be forwarded, the flow rate of the service data to be forwarded to the second terminal.

6. The method according to claim 1, wherein in a non-routing mode of the second terminal-further comprises:
   increasing a forwarding delay of the second terminal.

7. The method according to claim 6, wherein in a non-routing mode of the second terminal, the load flow rates of the multi-mode terminals are the load flow rates fed back during connections of the multi-mode terminals, and the load flow rates comprise: an access type in accessing by carrying the second network, a supported rate, information about whether or not being the forwarding node and a forwarding flow rate.

8. A method for data transmission, comprising:
   receiving, by a first network device, service data sent by a first terminal, wherein the first terminal is a single-mode terminal or a multi-mode terminal;
   monitoring a load flow rate forwarded via a back-end egress of the first network device in a first network;
   when the load flow rate reaches a preset load flow rate, switching the first network device from a forwarding mode to a routing mode; and selecting a second terminal connected with the first network device, as a forwarding node for the first terminal, wherein the second terminal is a multi-mode terminal; and
   forwarding, by the first network device, the service data sent by the first terminal to the second terminal such that the second terminal converts the service data and sends the converted service data to a second network device in a second network,
   wherein the selecting the second terminal as the forwarding node for the first terminal comprises:
   except to the first terminal that is connected to the first network device, the first network device sending an instruction to multi-mode terminals to query from only the multi-mode terminals, load flow rates of the multi-mode terminals; and
   the second terminal, which being one of the multi-mode terminals, in response to the instruction sent from the first network device to a terminal, transmitting a load flow rate of the terminal to the first network device, wherein the terminal is a multi-mode terminal, and the load flow rate of the terminal comprises: at least one of the load flow rate received and sent via the first network, the load flow rate received and sent via the second network, an access type in accessing the second network and a current rate;
   receiving by the second terminal, a mode switching instruction sent by the first network device;
   switching the second terminal from a terminal mode to a forwarding mode according to the load flow rate of the terminal and a configuration strategy;
   sending by the second terminal to the first network device, a message for acknowledging the mode switching;

receiving by the second terminal, the service data to be forwarded to the second network, wherein the service data is sent by the first network device in the first network;

converting by the second terminal, an address and a frame format of the service data; and sending by the second terminal, the converted service data to a second network device in the second network;

wherein the first and the second networks are of different types.

9. The method according to claim 8, wherein in the routing mode, the method further comprises:

feeding back to the first network device a request of decreasing a flow rate for forwarding the service data in a case that the flow rate of the forwarded service data exceeds a first preset threshold in the process of forwarding the service data; receiving a response indicating that the first network device decreases the flow rate for forwarding the service data; or feeding back to the first network device a request of increasing a flow rate for forwarding the service data in a case that the flow rate for forwarding the service data is smaller than a second preset threshold; receiving a response indicating that the first network device increases the flow rate for forwarding the service data.

10. The method according to claim 8, wherein in a non-routing mode, before the receiving the service data to be forwarded to the second network, the method further comprises:

detecting and predicting a data packet of the service data sent and received in the second network; and switching from the terminal mode to the forwarding mode in a case that a difference between the data packet and a preset data packet is greater than a preset threshold.

11. The method according to claim 10, further comprising:

monitoring a flow rate for transceiving the service data in the second network in the process of forwarding the service data; and switching from the forwarding mode to the terminal mode in a case that the flow rate is smaller than a third threshold.

12. An apparatus for data transmission, comprising:

a first receiving unit, configured to receive service data sent by a first terminal, wherein the first terminal is a single-mode terminal or a multi-mode terminal;

a monitoring unit, configured to monitor a load flow rate forwarded via a back-end egress of a first network device in a first network;

a first switching unit, configured to switch the first network device from a forwarding mode to a routing mode in a case that the load flow rate reaches a preset load flow rate;

a selecting unit, configured to select a second terminal connected with the first network device, as a forwarding node for the first terminal in a case that the switching unit switches from the forwarding mode to the routing mode, wherein the second terminal is a multi-mode terminal; and a forwarding unit, configured to forward the service data sent by the first terminal to the second terminal such that the second terminal converts the service data and sends the converted service data to a second network device in a second network, wherein the first and the second networks are of different types, wherein the selecting unit comprises:

a first querying unit, configured to send, except to the first terminal that is connected to the first network device, an instruction to multi-mode terminals to query from only the multi-mode terminals, load flow rates of the multi-mode terminals, wherein the load flow rates of the multi-mode terminals comprises: at least one of the load flow rate received and sent via the first network, the load flow rate received and sent via the second network, an access type in accessing the second network and a current rate; and a first forwarding node selecting unit, configured to select, according to the load flow rates, the multi-mode terminal with a small load flow rate as the forwarding node for the first terminal, wherein the selected multi-mode terminal with the small load flow rate is the second terminal.

13. The apparatus according to claim 12, wherein in a routing mode, the apparatus further comprises:

a first sending unit, configured to send a mode switching instruction to the second terminal before the service data is forwarded to the second terminal by the forwarding unit;

a second receiving unit, configured to receive a message for acknowledging the mode switching sent by the second terminal.

14. The apparatus according to claim 13, further comprising:

a second switching unit, configured to switch from the forwarding mode to the terminal mode in a case that the load flow rate does not reach the preset load flow rate;

a third sending unit, configured to send to the second terminal an instruction for switching off the forwarding mode switching;

a fourth receiving unit, configured to receive a message for acknowledging to switch off the forwarding mode sent by the second terminal; and a fourth sending unit, configured to send the service data directly.

15. The apparatus according to claim 12, further comprising:

an acquisition unit, configured to acquire network load information of the second terminal in a process of forwarding the service data; and a adjusting unit, configured to adjust dynamically, according to the network load information, a volume to be forwarded to the second terminal.

16. The apparatus according to claim 15, wherein the acquisition unit comprises a request sending unit and a request receiving unit; or a third receiving unit, a second sending unit and a flow rate control unit, wherein the request sending unit is configured to send to the second terminal a request for actively querying network load information;

the request receiving unit is configured to receive from the second terminal a response comprising the network load information;

the third receiving unit is configured to receive, in the process of forwarding the service data, a request of decreasing or increasing the flow rate for forwarding the service data, wherein the request is sent from the second terminal;

the second sending unit is configured to send to the second terminal a response for acknowledging to decrease or increase the flow rate for forwarding the service data; and the flow rate control unit is configured to decrease or increase, in accordance with a strategy for scheduling traffic to be forwarded, the flow rate for forwarding the service data to the second terminal.

17. The apparatus according to claim 12, wherein in the routing mode of the second terminal, the selecting unit comprises:
increase a forwarding delay of the second terminal.

18. An apparatus for data transmission, the apparatus being a terminal, comprising:
a first sending unit, configured to in response to an instruction sent from a first network device to the terminal, transmit a load flow rate of the terminal to the first network device, wherein the terminal is a multi-mode terminal, wherein the load flow rates of the terminal comprises: at least one of the load flow rate received and sent via the first network, the load flow rate received and sent via the second network, an access type in accessing the second network and a current rate, wherein:
prior to the terminal receiving the instruction from the first network device, the first network device receives service data sent by another terminal which is a single-mode terminal or a multi-mode terminal in the first network, wherein the first network device monitors a load flow rate forwarded via a back-end egress; when the load flow rate reaches a preset load flow rate, the first network device switches from a forwarding mode to a routing mode; the first network device forwards the service data sent by the another terminal to the terminal such that the terminal converts the service data and sends the converted service data to a second network device in a second network and selects the terminal which is connected with the first network device, as a forwarding node for the another terminal, wherein the selecting of the terminal as the forwarding node for the another terminal comprises:
except to the another terminal that is connected to the first network device, the first network device sends an instruction to query from only multi-mode terminals in the first network, load flow rates of the multi-mode terminals; and the terminal is selected according to the load flow rates, from one of the multi-mode terminals with a small load flow rate in the first network as the forwarding node for the another terminal,
the terminal further comprises:
a second receiving unit, configured to further receive a switching instruction sent by the first network device before receiving the service data to be forwarded to the second network;
a first switching unit, configured to switch from a terminal mode to a forwarding mode according to a load flow rate of the apparatus and a configuration strategy;
the first sending unit, further configured to send to the first network device a message for acknowledging the mode switching;
a first receiving unit, configured to receive service data to be forwarded to a second network, wherein the service data is sent by the first network device in the first network;
a converting unit, configured to convert an address and a frame format of the service data; and
a forwarding unit, configured to send the converted service data to the second network device in the second network;
wherein the first and the second networks are of different types.

19. The apparatus according to claim 18, wherein in the routing mode, the apparatus further comprises a first determining unit, a second sending unit and a third receiving unit; and/or comprises a second determining unit, a third sending unit and a fourth receiving unit, wherein
the first determining unit is configured to determine whether a flow rate for forwarding the service data exceeds a first preset threshold in the process of forwarding the service data;
the second sending unit is configured to feed back to the first network device a request of decreasing the flow rate for forwarding the service data in a case that the first determining unit determines that the flow rate for forwarding the service data exceeds the first preset threshold;
the third receiving unit is configured to receive a response indicating that the first network device decreases the flow rate for forwarding the service data; or
the second determining unit is configured to determine whether the flow rate for forwarding the service data is smaller than a second preset threshold in the process of forwarding the service data;
the third sending unit is configured to feed back to the first network device a request of increasing the flow rate for forwarding the service data in a case that the second determining unit determines that the flow rate for forwarding the service data is smaller than the second preset threshold;
the fourth receiving unit is configured to receive a response indicating that the first network device increases the flow rate for forwarding the service data.

20. The apparatus according to claim 18, further comprising:
a fifth receiving unit, configured to receive an instruction for switching off a forwarding mode sent by the first network device;
a fourth sending unit, configured to send to the first network device a message for acknowledging to switch off the forwarding mode; and
a second switching unit, configured to switch from the forwarding mode to the terminal mode.

21. The apparatus according to claim 18, further comprising:
a predicting unit, configured to detect and predict a data packet of the service data sent and received in the second network before the service data to be forwarded to the second network is received;
a third determining unit is configured to determine whether a difference between the data packet and a preset data packet is greater than a preset threshold; and
a third switching unit is configured to switch from the terminal mode to the forwarding mode in a case that the third determining unit determines that the difference between the data packet and the preset data packet is greater than the preset threshold.

22. The apparatus according to claim 21, further comprising:
a monitoring unit, configured to monitoring a flow rate for transceiving the service data in the second network;
a fourth determining unit, configured to determine whether the flow rate is smaller than a third threshold; and
a fourth switching unit, configured to switch from the forwarding mode to the terminal mode in a case that the fourth determining unit determines that the flow rate is smaller than the third threshold.

* * * * *